Patented Mar. 10, 1931

1,796,108

UNITED STATES PATENT OFFICE

GEORG KALISCHER, OF FRANKFORT-ON-THE-MAIN, AND FRITZ FRISTER, OF FECHEN-HEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

CHLORINATED PRODUCT OF THE BENZENE SERIES AND PROCESS OF MAKING SAME

No Drawing. Application filed March 7, 1928, Serial No. 259,918, and in Germany March 12, 1927.

We have found that a series of valuable chlorinated products are formed by treating the 1.3-dimethylbenzene-4-sulfonic acid in a mineral acid solution with a chlorinating agent. Depending on the amount of chlorine employed the mono-, di- or tri-chloro-1.3-dimethylbenzene-4-sulfonic acid is obtained by our process. By hydrolysis effected in the usual manner, for instance, by heating with sulfuric or phosphoric acid or the like, the sulfonic acid group is split off from the molecule of the aforesaid compounds and the corresponding chlorinated benzene derivatives are obtained. For splitting off the sulfonic acid group from the trichloro-1.3-dimethylbenzene-sulfonic acid an excess of chlorine may be employed, whereby the sulfonic acid group is replaced by chlorine and tetrachloro-1.3-dimethylbenzene is obtained.

The probable course of reaction and the formation of all the products mentioned above may be illustrated by the following scheme of formulæ:

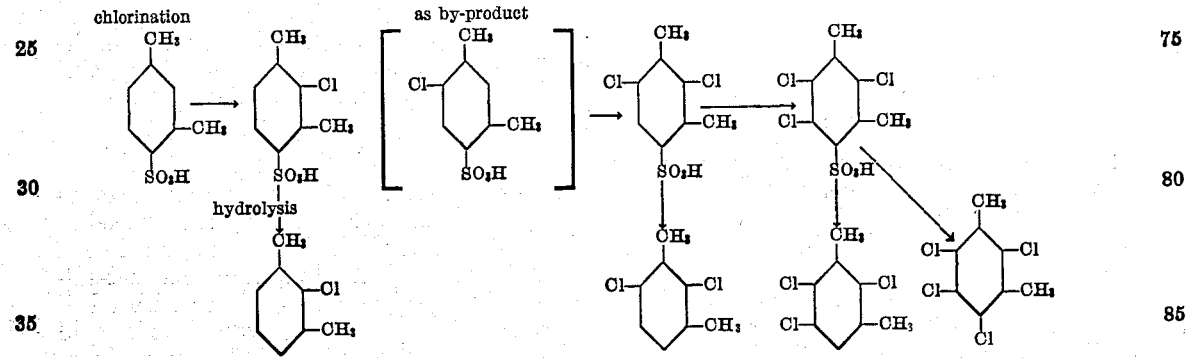

Our process is carried out for instance by introducing in a suitable manner an amount of chlorine corresponding to the intended degree of chlorination into the mineral acid solution of the 1.3-dimethylbenzene-4-sulfonic acid. Instead of gaseous chlorine, chlorine compounds which are capable of evolving chlorine such as chlorates in a dilute hydrochloric acid solution or hypochlorites in an acid solution may be used. By the addition of a suitable catalyst the chlorination process may be accelerated. In order to prepare the higher chlorinated products one may start from lower chlorination products instead of from the 1.3-dimethyl-benzene-4-sulfonic acid itself; this may be an advantage in some cases as to the purity of the final products.

The formation of a series of valuable chlorination products, which are produced in a smooth reaction with an excellent yield and in a very pure state according to our process, is a surprising fact, as the bromination of the 1.3-dimethylbenzene-4-sulfonic acid in aqueous solution leads to a mixture of various substances, from which besides a bromo-1.3-dimethylbenzene-4-sulfonic acid mono- and dibromodimethylbenzene could be isolated only in a complicated manner (cf. E. Weinberg, Berichte der deutschen chemischen Gesellschaft, vol. 11, page 1062, and Kelbe and Stein, Berichte der deutschen chemischen Gesellschaft, vol. 19, page 2138).

The chlorination products obtained according to our process may be used as intermediates for the production of dyestuffs.

In order to further illustrate our invention the following examples are given, the parts being by weight and all temperatures in centigrade degrees. But we wish to be understood that we are not limited to the products nor reaction conditions mentioned therein.

Example 1

630 parts of a solution of sodium hypochlorite, corresponding to 73 parts of available chlorine, are gradually introduced at 40° while well stirring into a solution of 220 parts of 1.3-dimethylbenzene-4-sulfonic acid in 1000 parts of water. The reaction product consisting mainly of the new 2-chloro-1.3- dimethylbenzene-4-sulfonic acid separates in the form of the sodium salt. By recrystallization, for instance from water, the pure sodium salt of 2-chloro-1.3-dimethylbenzene-4-sulfonic acid is obtained. The lead salt of this acid is difficultly soluble, the barium salt nearly insoluble in water. The amide of the 2-chloro-1.3-dimethylbenzene-4-sulfonic acid melts at about 223°.

The isomeric 6-chloro-1.3-dimethylbenzene-4-sulfonic acid can be isolated from the mother liquor, obtained by the recrystallization, its amide melts at 195° as described by Jacobsen (Berichte der deutschen chemischen Gesellschaft, vol. 18, page 1762).

The same 2-chloro-1.3-dimethylbenzene-4-sulfonic acid is obtained when chlorine is passed through a solution of 1.3-dimethylbenzene-4-sulfonic acid in 3–4 times its weight of conc. sulfuric acid at ordinary temperatures, advantageously in the presence of a catalyst as iodine, until the calculated increase in weight is attained. The chlorination product may be separated after diluting the solution with water, by partially neutralizing it with alkali. It shows the properties described above.

100 parts of the above mentioned sodium salt of the new 2-chloro-1.3-dimethylbenzene-4-sulfonic acid are dissolved in 500–600 parts of sulfuric acid of 62° Bé. and heated to about 160–170°. Then by passing superheated steam of 200° through the mass the new 2-chloro-1.3-dimethylbenzene is distilled. In a pure state it boils at about 185–187°. It corresponds probably to the formula:

Example 2

145 parts of chlorine are slowly passed at 90° while stirring into a solution of 220 parts of 1.3-dimethylbenzene-4-sulfonic acid in 1000 parts of water with addition of 10 parts of ferric chloride. Then the solution is cooled down and partially neutralized by means of about 230 parts of a caustic soda solution of 33%. The separating dichloro-1.3-dimethylbenzene-4-sulfonic acid is obtained as white bright leaflets and may be recrystallized from water. It corresponds probably to the formula:

Its amide melts at about 330° as described in Berichte der deutschen chemischen Gesellschaft, vol. 23, page 2320.

By means of hydrolyzing agents 2.6-dichloro-1.3-dimethylbenzene is formed in a pure state, obtainable hitherto only in mixture with isomeric products by chlorination of 1.3-dimethylbenzene.

Example 3

1200 parts of a sodium hypochlorite solution corresponding to 140 parts of available chlorine are slowly introduced at 85–90° into a solution of 220 parts of 1.3-dimethylbenzene-4-sulfonic acid in 1000 parts of water and 1200 parts of hydrochloric acid ($d=1.18$). The very difficultly soluble sodium salt of the new trichloro-1.3-dimethylbenzene-4-sulfonic acid separates. After cooling down it is filtered and recrystallized from hot water in order to remove small quantities of tetrachloroxylene formed as by-product. The new acid corresponds probably to the formula:

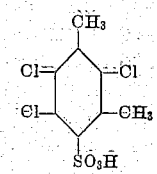

Its amide melts above 325°. By treating the product with a mineral acid the sulfonic acid group is split off and the hitherto unknown 2.5.6-trichloro-1.3-dimethyl-benzene is obtained. It corresponds probably to the formula:

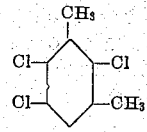

and crystallizes from glacial acetic acid in the shape of white needles having a melting point of about 95–96° C. and a boiling point of 255–260° C.

Example 4

A solution of 170 parts of sodium chlorate in 850 parts of water is slowly introduced at about 85°, while well stirring, into a solution of 220 parts of 1.3-dimethylbenzene-4-sulfonic acid in 1600 parts of water with addition of 1000 parts of hydrochloric acid ($d=1.18$). The tetrachloro-1.3-dimethylbenzene formed separates in solid form. It melts when crystallized from chlorobenzene at 218–220° as described in literature and corresponds to the formula:

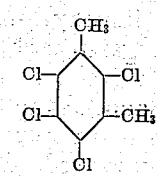

Example 5

A mixture of 22 parts of 1.3-dimethylbenzene-4-sulfonic acid, 240 parts of hydrochloric acid ($d=1.18$) and 90 parts of nitric acid ($d=1.38$) is slowly heated while stirring at 80–85°. With an evolution of reddish vapors, precipitation of white needle shaped crystals takes place. When, after some hours, their quantity ceases to increase, the separated tetrachloro-1.3-dimethylbenzene is filtered off and washed with water until a neutral reaction. It is identical with the product described in Example 4.

We claim:

1. A process which comprises treating 1.3-dimethylbenzene-4-sulfonic acid in an acid solution with a chlorinating agent and subjecting the products of reaction containing a sulfonic acid group to the action of a hydrolyzing agent.

2. A process which comprises treating 1.3-dimethylbenzene-4-sulfonic acid in an acid solution with a chlorinating agent with addition of iodine as a catalyst and subjecting the products of reaction containing a sulfonic acid group to the action of a hydrolyzing agent.

3. A process which comprises treating 1.3-dimethylbenzene-4-sulfonic acid in an acid solution with a chlorinating agent until a quantity of chlorine is absorbed corresponding to three molecular proportions and treating the product of reaction with a hydrolyzing agent.

4. A process which comprises treating 1.3-dimethylbenzene-4-sulfonic acid in an acid solution with a chlorinating agent.

5. A process which comprises treating 1.3-dimethylbenzene-4-sulfonic acid in an acid solution with a chlorinating agent with addition of iodine as a catalyst.

6. A process which comprises treating 1.3-dimethylbenzene-4-sulfonic acid in an acid solution with a chlorinating agent until a quantity of chlorine is absorbed corresponding to three molecular proportions.

7. As new compounds benzene derivatives corresponding probably to the general formula:

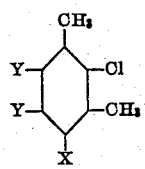

in which formula X means hydrogen or a sulfonic acid group and both Y's represent either hydrogen or chlorine.

8. As new compounds benzene derivatives corresponding probably to the general formula:

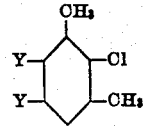

in which formula both Y's represent either hydrogen or chlorine.

9. As a new compound the 2.5.6-trichloro-1.3-dimethylbenzene of the probable formula:

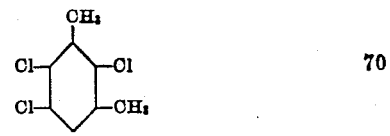

crystallizing from glacial acetic acid as white needles melting at about 95–96° C., boiling at 255–260° C.

In testimony whereof, we affix our signatures.

GEORG KALISCHER.
FRITZ FRISTER.